United States Patent [19]
Reynolds

[11] Patent Number: 5,903,224
[45] Date of Patent: May 11, 1999

[54] LIGHT DISPLAY SYSTEM

[75] Inventor: John M. Reynolds, St. Louis, Mo.

[73] Assignee: Revolving Technologies, Inc., St. Louis, Mo.

[21] Appl. No.: 09/025,618

[22] Filed: Feb. 18, 1998

[51] Int. Cl.$^6$ .................................................. G08B 5/22
[52] U.S. Cl. ............................... 340/815.45; 340/815.53; 340/432; 345/31; 345/39
[58] Field of Search ..................... 340/432, 444, 340/815.53, 815.52, 815.45; 345/1, 2, 31, 39; 315/312, 323

[56] References Cited

U.S. PATENT DOCUMENTS

| | | | |
|---|---|---|---|
| 4,019,171 | 4/1977 | Martelet | 340/134 |
| 4,115,942 | 9/1978 | Sears | 40/547 |
| 4,264,845 | 4/1981 | Bednarz | 315/323 |
| 4,338,547 | 7/1982 | McCaslin | 315/312 |
| 4,470,044 | 9/1984 | Bell | 345/1 |
| 4,631,848 | 12/1986 | Iwasa et al. | 40/427 |
| 4,763,230 | 8/1988 | Cummings et al. | 362/78 |
| 4,796,972 | 1/1989 | Thomas et al. | 350/99 |
| 5,057,827 | 10/1991 | Nobile et al. | 345/31 |
| 5,121,305 | 6/1992 | Deed et al. | 362/72 |
| 5,406,300 | 4/1995 | Tokimoto et al. | 345/31 |
| 5,418,697 | 5/1995 | Chiou | 362/72 |
| 5,424,924 | 6/1995 | Ewing et al. | 362/80 |
| 5,634,707 | 6/1997 | Bailey, Jr. | 362/78 |

*Primary Examiner*—Edward Lefkowitz
*Assistant Examiner*—Davetta Woods
*Attorney, Agent, or Firm*—Senniger, Powers, Leavitt & Roedel

[57] ABSTRACT

A light display system adapted for mounting on a rotatable member and capable of generating an image visually perceptible in a reference frame fixed relative to the rotatable member. The display system has a base adapted for mounting on the rotatable member for rotation with the rotatable member about an axis of rotation. Plural light arrays are mounted on the base at angularly spaced locations around a center of the base; each light array has a plurality of lamps. A sensor is operable to detect the fixed reference frame and to provide a signal indicative of the fixed reference frame. A controller is operatively connected to the sensor for receiving the signal from the sensor and is operatively connected to the light arrays. The controller is configured for firing the light arrays in predetermined positions relative to the fixed reference frame to form the image visually perceptible in the fixed reference frame.

19 Claims, 12 Drawing Sheets

LIGHT DISPLAY SYSTEM

BACKGROUND OF THE INVENTION

The present invention relates generally to light display devices and more particularly to a light display system which forms an image when rotated.

Moving objects, such as the wheels of a bicycle, car or other vehicle, inherently attract the attention of the eye because of their motion. A message or design on the moving object which is perceptible to those in a fixed reference frame would call attention to itself. It is known to produce an image on a wheel which appears stationary to persons in a fixed reference frame. An example is disclosed in U.S. Pat. No. 4,631,848, which uses reflected light on a wheel cover to form what appears to be a fixed image on the wheel. The cover is formed with multiple (e.g., 4) angularly spaced images which are permanently formed on the cover. The images are formed so that they reflect light only in a predetermined direction. Thus, the images are visible to a person in a certain location when the image is in a certain rotational position. As a result, an image which appears fixed (relative to the rotation of the wheel) is formed. The appearance of the fixed image is a result of the well known "after image" effect in which the brain will fill in the time gaps between the successive appearances of the image when those time gaps become sufficiently small, so that the image is perceived as constant and fixed.

It is thus known to employ reflectors to create a fixed image on a rotating object. However, the image which is formed is not well-defined, and there is no flexibility to change the image without replacing the entire cover. The image is not well-defined because the entire image is displayed at each quarter rotation of the wheel. Thus, a relatively blurry image is produced. The image displayed on the known devices cannot be readily changed by the user because the image is permanently imprinted on the device. Further, there is no possibility for creating an image which appears to move when viewed in a fixed reference frame.

SUMMARY OF THE INVENTION

Among the several objects and features of the present invention may be noted the provision of a light display system which can be mounted on a rotating member and form a predetermined image visually perceptible to an observer in a fixed reference frame when the rotating member is turning; the provision of such a system which forms the image using a relatively small number of lights and low power consumption; the provision of such a system that allows the image to be easily and quickly changed; the provision of such a system capable of displaying alphanumeric messages as well as preprogrammed patterns; the provision of such a system that makes the vehicle upon which it is mounted more visible; and the provision of such a system that automatically conserves power when the system is not in use.

Briefly, apparatus of this invention is a light display system adapted for mounting on a member rotatable about an axis of rotation and capable of generating an image visually perceptible in a reference frame fixed relative to the rotatable member. The display system generally comprises a base adapted for mounting on the rotatable member for rotation with the rotatable member about the axis of rotation. Plural light arrays are mounted on the base at angularly spaced locations around a center of the base, each light array having a plurality of lamps. A sensor is operable to detect the fixed reference frame and to provide a signal indicative of the fixed reference frame. A controller is operatively connected to the sensor for receiving the signal from the sensor and is operatively connected to the light arrays. The controller is configured for firing the light arrays in predetermined positions relative to the fixed reference frame to form the image upon rotation of the light arrays which is visually perceptible in the fixed reference frame.

In another aspect of the invention, a position reference system is adapted for mounting on a member rotatable about an axis of rotation. The reference system generally comprises a base adapted for mounting on the rotatable member for rotation with the rotatable member about the axis of rotation. A sensor is operable to detect a fixed reference frame and to provide a signal indicative of the fixed reference frame. A controller is operatively connected to the sensor for receiving the signal from the sensor. A reference member is mounted on the base for movement relative to the base, said reference member including means for fixing the reference member relative to the fixed reference frame and disposed for detection by the sensor thereby providing the indication of the fixed reference frame.

Other objects and features of the present invention will be in part apparent and in part pointed out hereinafter.

BRIEF DESCRIPTION OF THE DRAWINGS

FIGS. 8A–D are flowcharts illustrating the general operation of a microcontroller of the system:

Corresponding reference characters indicate corresponding parts throughout the several views of the drawings.

DETAILED DESCRIPTION OF THE PREFERRED EMBODIMENT

Figure 1:
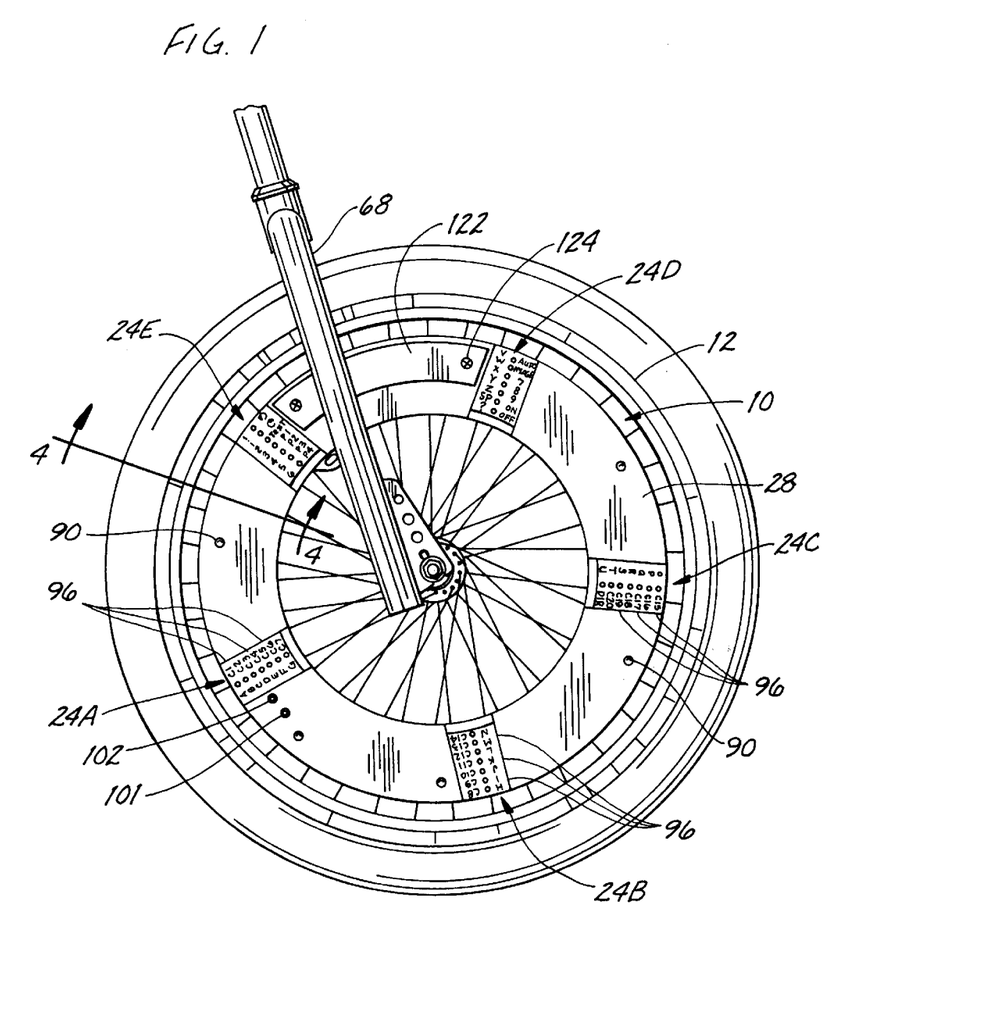
FIG. 1 is a side elevational view of the light display system of the present invention mounted on a bicycle wheel.
Figure 2:
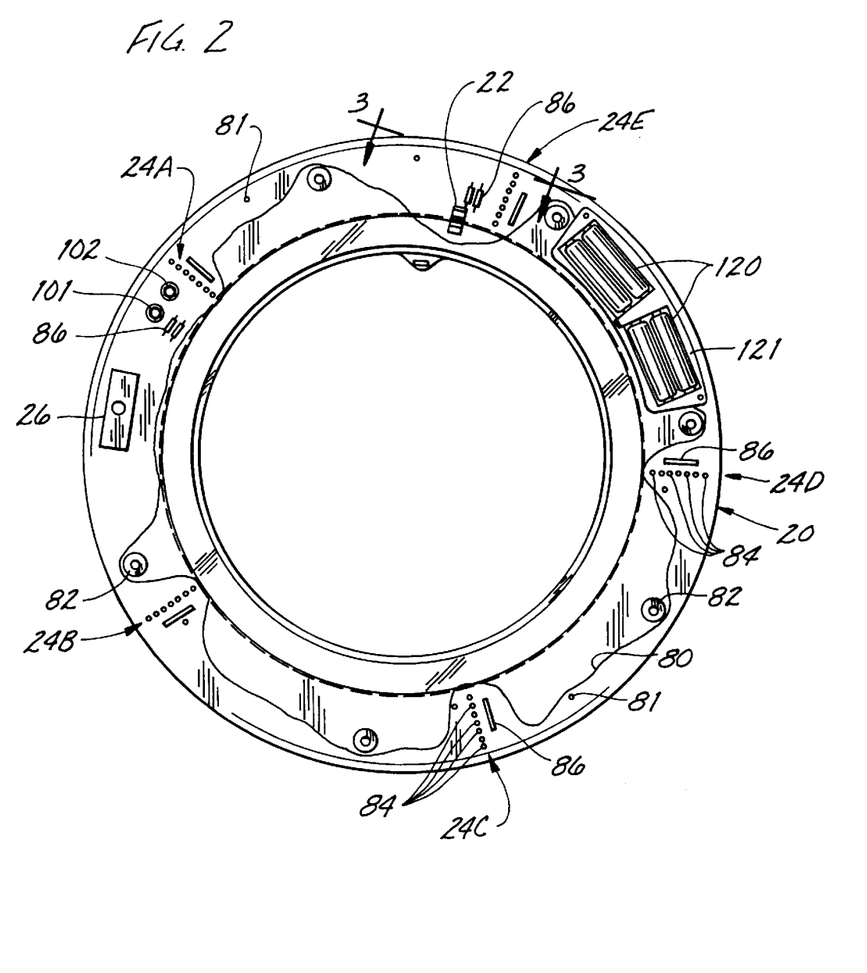
FIG. 2 is a side elevational view of the system with a cover plate removed.

Referring now to the drawings and in particular to FIGS. 1 and 2, a light display system of the present invention is indicated generally at 10. The system is adapted for mounting on a rotatable member for rotation with the rotatable member about an axis of rotation. In the illustrated embodiment, the system 10 is shown as mounted on a front wheel 12 of a bicycle 14 (FIG. 7) further comprising a frame 16 and a back wheel 18. Although the embodiments of the invention described hereinafter are adapted for mounting on the bicycle front wheel 12, it is contemplated that the system 10 could be readily adapted for attachment to wheels of other vehicles or to rotating objects not associated with vehicles. The system 10 includes a base, indicated generally at 20, adapted for mounting on the front wheel 12, means for providing a fixed reference frame and a sensor in the form of an optical switch 22 to detect the fixed reference frame. The system 10 also includes light arrays 24A–24E to form an image, and a microcontroller 26 to synchronize the firing of the light arrays at predetermined positions during rotation. Other electrical components are provided for operation of the system 10 as described below, and a base cover 28 encloses the reference frame means, optical switch 22, light arrays 24A–24E, microcontroller 26 and electrical components within the base 20.

The base 20 is preferably formed of a lightweight, durable material, such as acrylic plastic, has a generally annular shape and has a large, circular central opening. As shown in FIG. 4, the base 20 has an annular flat portion 31 extending perpendicularly to the axis of rotation, an inner wall 32 and outer wall 34 projecting axially outwardly from inner and outer edges of the flat portion. It is contemplated that a protective wall (not shown) may be positioned inward of the inner wall to shield the electrical components from the outside environment. The base 20 also has a flange 36 (FIGS. 3 and 4) integrally formed therewith, protruding from a side facing the front wheel 12. When the base 20 is attached to the front wheel 12, the flange 36 contacts spokes 40 of the wheel. The base 20 is attached to five of the spokes 40 using five locking clips indicated generally at 44 (only one is shown). Each locking clip 44 has two pins 46 and a retainer 48. The two pins are slipped through holes 50 in the flange and the pins are then bent at a top end so that the pins cannot slip back through the holes. It is envisioned that a snap-in or other suitable connector may also be employed. The retainer 48 can be made of sheet metal or other suitable material and is formed to have a bend midway along its length. The bend of the retainer 48 receives the spoke 40 so that the retainer envelopes the spoke and such that ends of the retainer are in contact with the pins 46. The ends of the retainer 48 are then fixedly secured to the pins 46 by crimping each end over the bottom ends of the pins. The locking clips 44 ensure that the base 20 is fixedly secured to the front wheel 12 and will not shift during rotation.

An annular ring gear (broadly, "reference member") is generally indicated at 60. The ring gear is constructed of a lightweight, durable material, such as acrylic plastic, and is mounted on the base 20 for rotation relative to the base 20 about the axis of rotation of the front wheel 12. The ring gear 60 is shown as transparent, but it is to be understood that it need not be made of transparent material. More specifically, the ring gear 60 includes an annular slide 62 which is received in the base 20 and held between the base and the base cover 28 attached to the base. However, the slide 62 is free of fixed connection to the base 20, permitting relative sliding motion between the slide and the base and base cover 28. The slide 62 has a tab 64 which projects from between the base 20 and base cover 28 through an annular opening between the base and cover. A finger 66 extending outwardly from the tab 64 is engageable with structure in a fixed reference frame to hold the ring gear 60 from rotational movement with the base 20 and bicycle front wheel 12. In the illustrated embodiment, the finger 66 is engageable with a fork 68 of the bicycle frame 16 which mounts the front wheel on the bicycle frame. Once engaged with the fork 68, the finger 66 holds the ring gear 60 against further rotational movement with the base 20.

The ring gear 60 further comprises an annular lip 70 formed integrally with the slide 62 and extending radially outward (relative the axis of rotation of the front wheel 12) from the slide 62. (see FIG. 4). A number (60 in the preferred embodiment) of reference markers 76 are mounted on the lip 70 and are disposed in spaced apart, opposed relationship with the slide 62. The reference markers 76 are spaced apart from each other at substantially equiangular intervals around the full circumference of the ring gear 60. Each reference marker 76 is the same size, has the same rectangular shape and is spaced apart an equal distance from the adjacent markers. The spacing between adjacent markers 76 is equal to the width of the markers. The reference markers 76 are opaque for detection by the optical switch 22, as explained in detail hereinafter.

The base 20 receives a generally ring-shaped printed circuit board 80 upon which electrical components of the system 10 are mounted. The board is attached to the base 20 using fasteners such as screws 81. As shown in FIG. 2, the board 80 has an irregular shape. It is widest at the location of each light array 24A–24E and where other of the electrical components are mounted on the circuit board, and narrowest at the location of fastener studs 82 used for connecting the base cover 28 to the base 20. The five light arrays 24A–24E are mounted on the circuit board 80, and comprise light-emitting diodes 84 (LEDs) spaced equiangularly around the axis of rotation of the front wheel 12. The arrays 24A–24E will be referred to as first through fifth arrays, numbering them counterclockwise from the array imprinted with the upper case letter "A" (FIG. 1).

Figure 5:
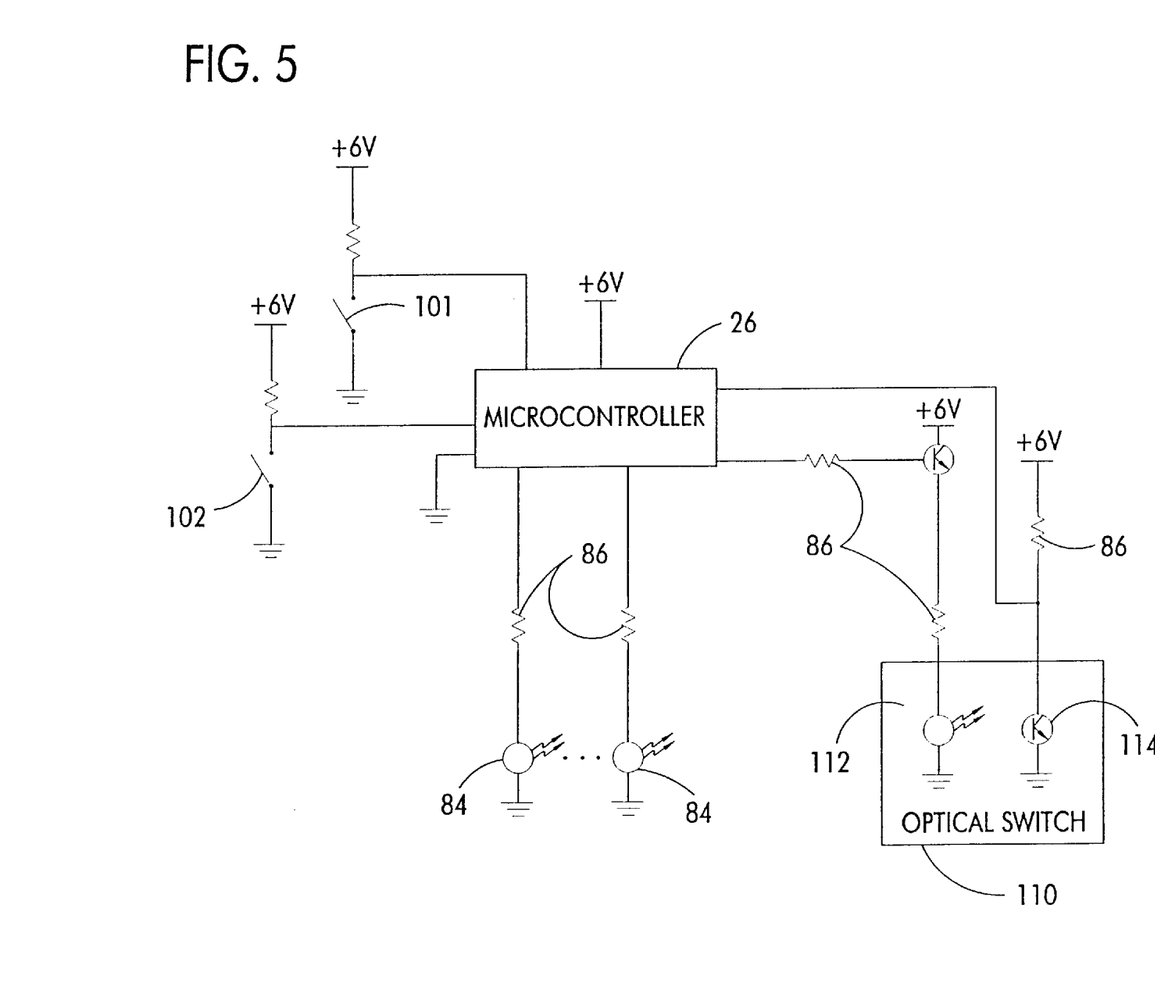
FIG. 5 is a schematic circuit diagram illustrating an embodiment of the system.

In the preferred embodiment, each array 24A–24E is composed of seven LEDs 84 arranged on a radial line that intersects the axis of rotation. However, the number of LEDs and the number of arrays may be other than shown in the drawings and still come within the scope of this invention. Moreover, the use of light emitting devices other than LEDs is contemplated. Referring to FIG. 5, the electrical schematic, each LED is connected in a known way via the circuit board 80 to a resistor 86 and then to the microcontroller 26. The microcontroller, such as Model No. COP8SA, manufactured by National Semiconductor of Santa Clara, Calif., is mounted on the circuit board 80 and controls the firing of each LED as explained below. Prior to mounting on the circuit board 80, the microcontroller is programmed to process inputs as explained below using software such as COP8C, sold by ByteCraft Pty, Ltd. of Mordialloc, Victoria, Australia.

The base cover 28 is L-shaped in cross section and made of relatively thin material, preferably of the same material as the base 20. The base cover has a shape generally complementary to that of the base so that it covers the opening of the base but leaves an opening for the ring gear 60 between the base and cover. The base cover 28 rests against the outer wall 32 of the base 20 and against the five fastener studs 82 protruding from the base. Preferably, portions of the base cover 28 not covering LEDs 84 are colored black to improve the visibility of the LEDs when illuminated. The base cover 28 is preferably permanently attached to the base 20 using fasteners such as rivets 90 inserted into holes in the studs 82 (FIG. 1). Symbols 96 are printed on the base cover 28 adjacent each LED and are used to program the system 10 as described below. During programming, an LED 84 will be illuminated or blink adjacent to a particular symbol 96 to indicate a programming function or selection.

The system 10 includes a first push-button switch 101 and a second push-button switch 102, which input programming choices to the system, as described below. The first and second push-button switches 101, 102 are mounted on the circuit board 80 to the left of the first array 24A, as shown in FIG. 1, and project through a cutout formed in the base cover 28. Referring to FIG. 5, the push-button switches 101 and 102 are connected through the circuit board 80 to the microcontroller 26. Four "AA" sized batteries 120 are received within a battery compartment 121 in the base 20. A cutout is provided in a portion of the base cover 28 and a portion of the circuit board 80 to receive the batteries. The batteries are connected to the circuit board 80 and microcontroller and provide power to the system 10 as shown in FIG. 5. A battery cover 122 fits over the cutout in the base cover 28 and is removably attached to the base 20 by suitable fasteners, such as screws 124, inserted into the studs 82 in the base.

Figure 3:
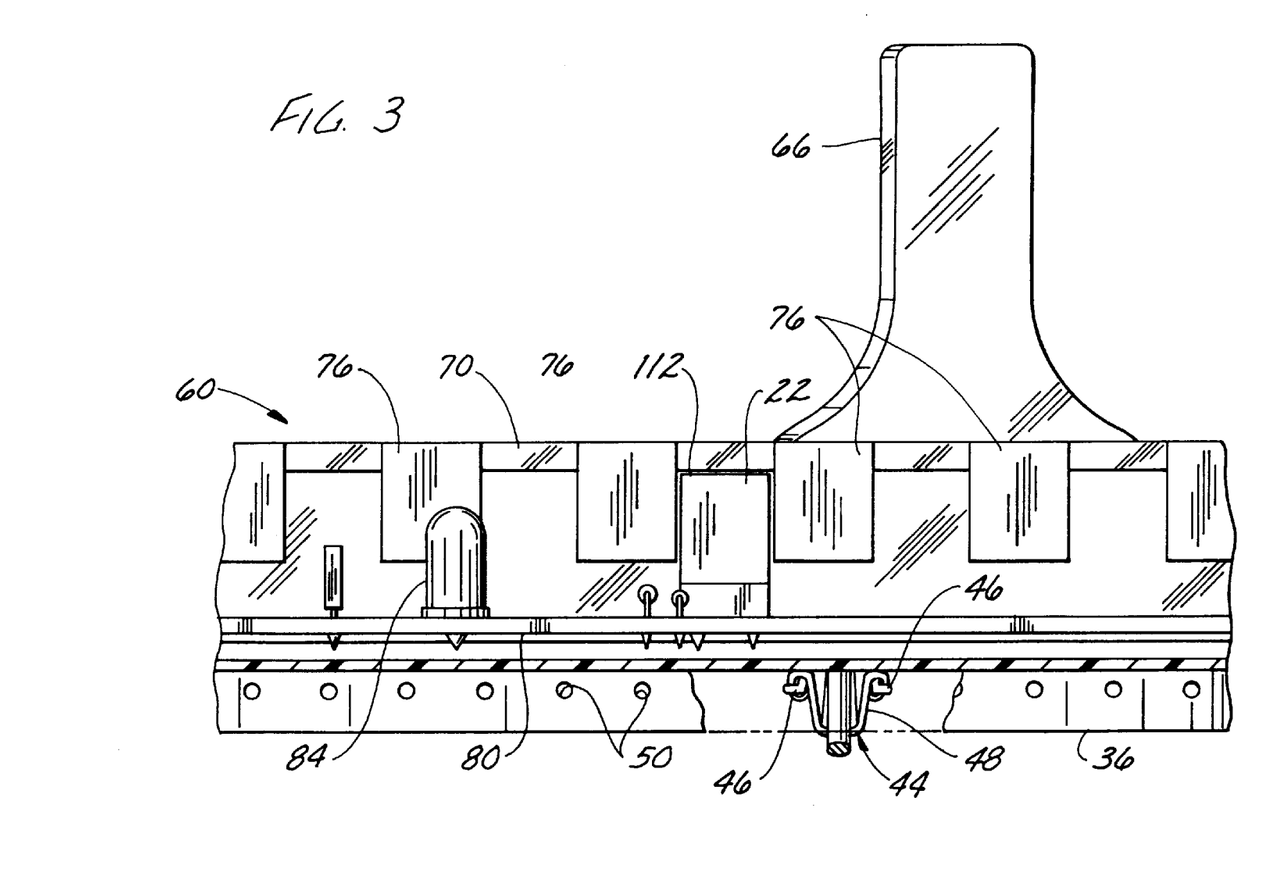
FIG. 3 is an enlarged, fragmentary section view taken along line 3—3 in FIG. 2 of a portion of the system showing an optical switch and reference markers on a ring gear.
Figure 4:
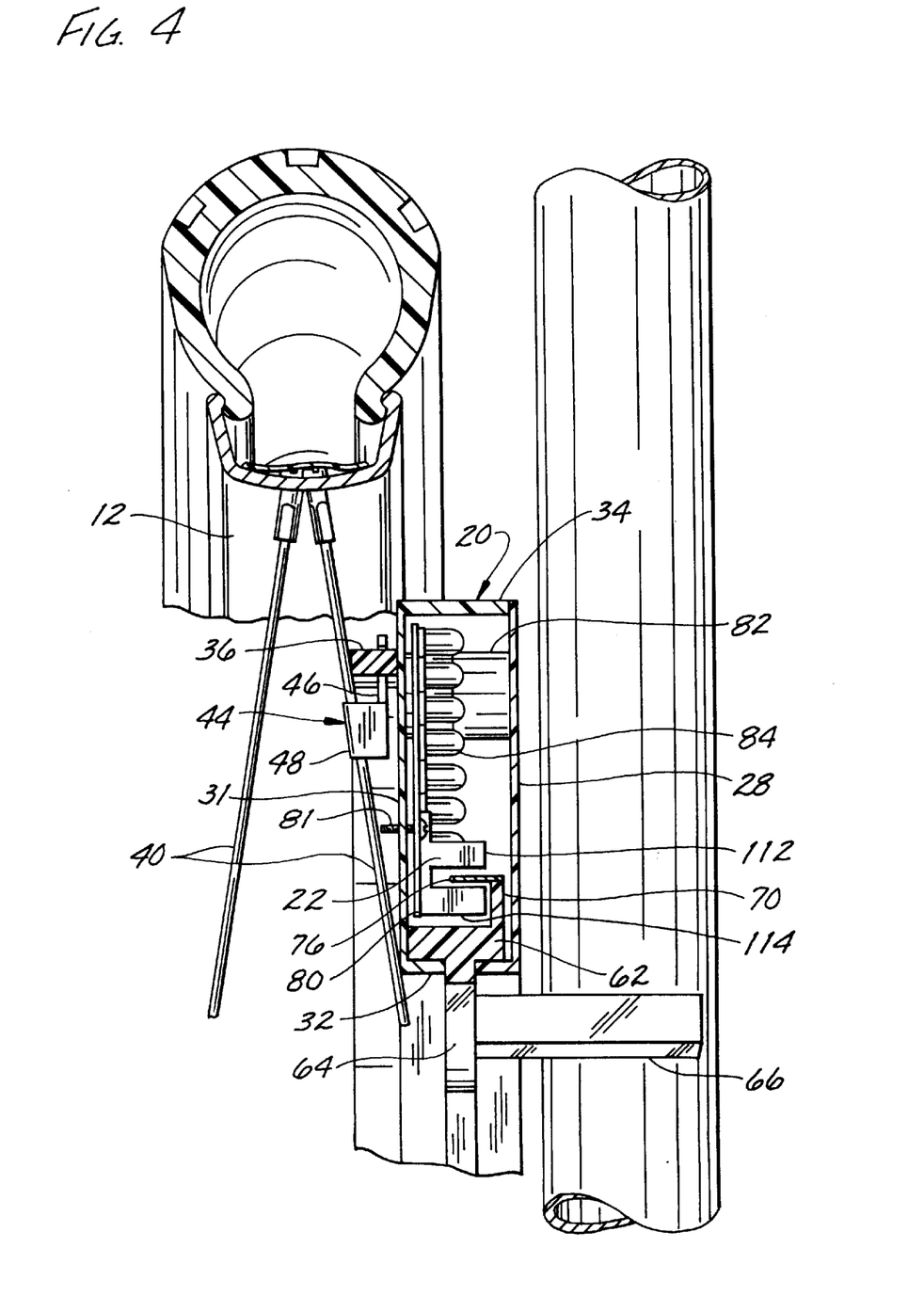
FIG. 4 is an enlarged, fragmentary section view taken along line 4—4 in FIG. 1.

Referring to FIGS. 3 and 4, as discussed above there are sixty reference markers 76 positioned on the lip 70 of the ring gear 60. The optical switch 22 includes a light beam generator 112 and a detector 114 mounted on the circuit board. The light beam generator 112 and the detector 114 of the optical switch 22 are positioned on the circuit board 80 so that the reference markers 76 will pass between the generator 112 and detector 114 during rotation of the front wheel 12. The light beam will thus be broken and the optical switch 22 will change states from open to closed as each reference marker passes the optical switch. The optical switch 22 changes states each time a reference marker 76 passes, allowing 6 volts to pass to the microcontroller 26 when the circuit is closed (no marker) and allowing 0 volts to pass when the circuit is open (marker). The sixty reference markers are equiangularly spaced and the space between adjacent markers is equal to the width of a marker, thus there are sixty equal spaces between markers. Therefore, a change in state of the optical switch 22 indicates that the wheel has rotated 1/120th of a revolution.

Note that the number of reference markers 76 can vary. For instance, the number of markers 76 might be reduced by determining the speed of the front wheel 12 (by using the signals from the optical switch 22) and programming the microcontroller 26 to use the speed to predict the position of the wheel. Furthermore, other devices (not shown) for establishing and detecting a fixed reference frame are contemplated. For instance, a magnetic system (not shown) could be used wherein a large number of magnetic reed switches are substituted for the reference markers 76, and a magnet is placed on the fork of the bicycle. Each time a magnetic reed switch passed the magnet, the reed switch would send a signal to the microcontroller. Thus, a fixed reference frame would be established for use in firing the light arrays 24A–24E. Further, the number of reed switches required to create the reference frame could be reduced as stated above by programming the microcontroller 26 to use the speed to predict the angular position of the wheel 12.

Figure 6A:
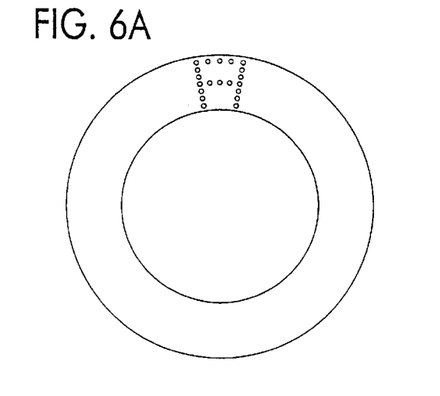
FIGS. 6A–F illustrate a firing sequence of LEDs to display a fixed image of the letter "A"
Figure 6B:
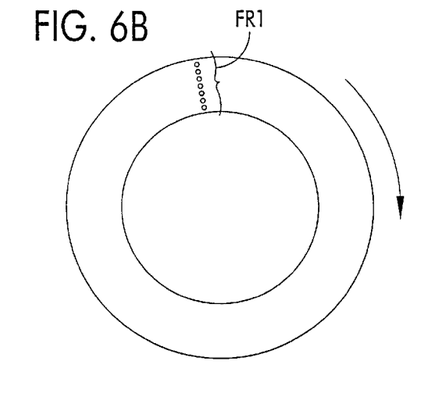
Figure 6C:
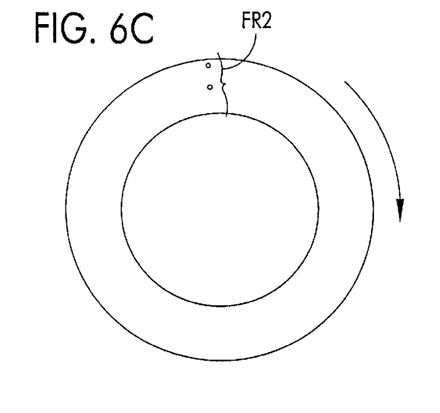
Figure 6D:
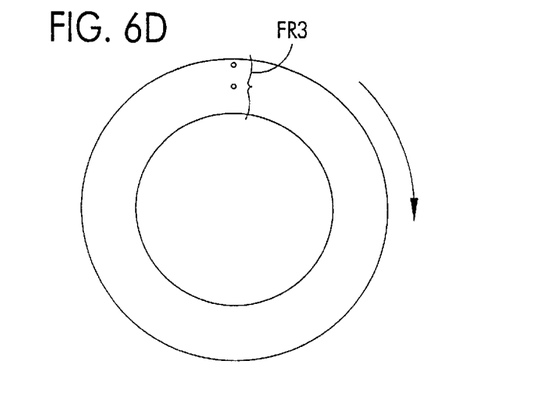
Figure 6E:
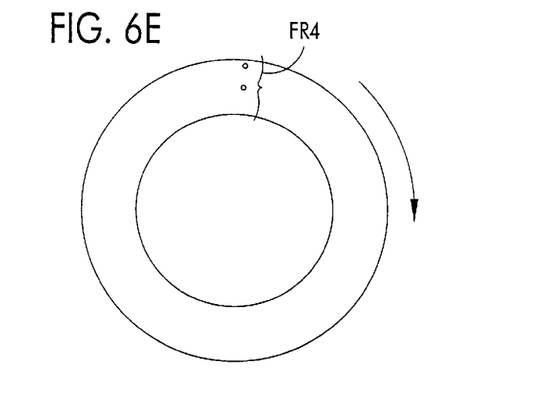
Figure 6F:
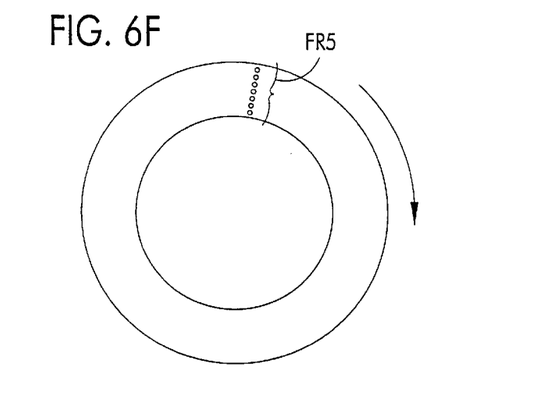
Figure 7:
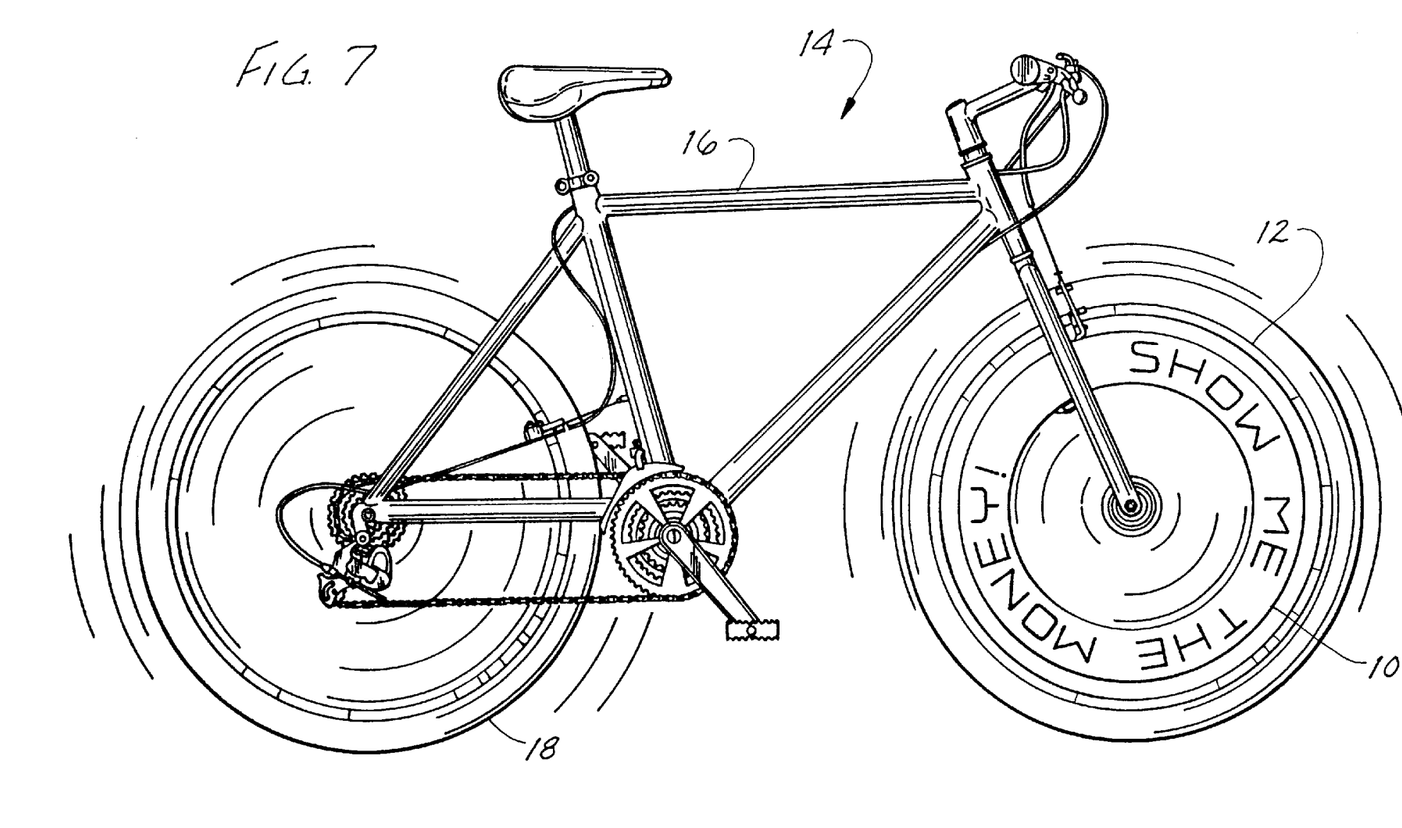
FIG. 7 is a side view of the bicycle in motion with the system attached to the front wheel and displaying a message.
Figure 7A:
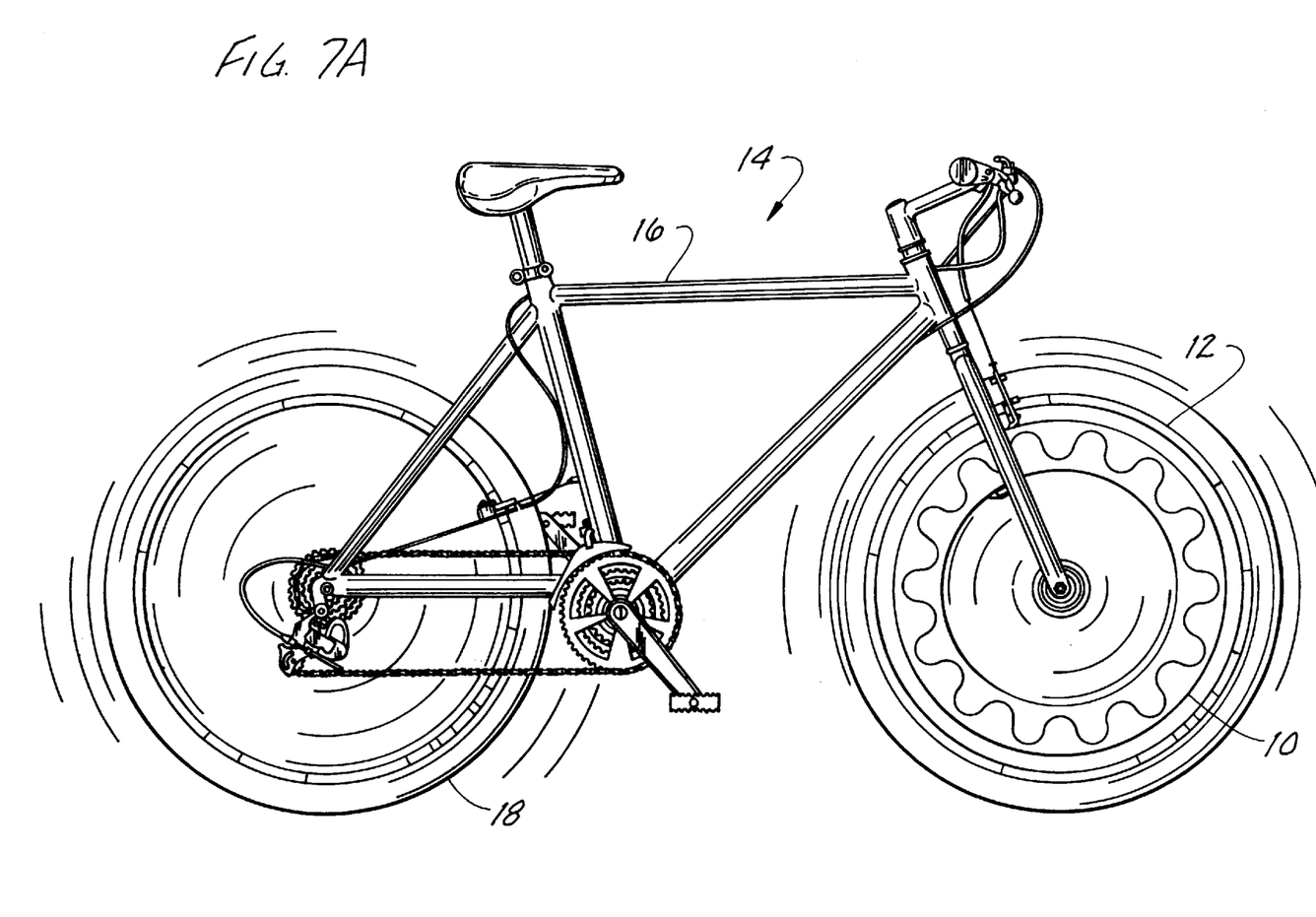
FIG. 7A is a side view of the bicycle in motion with the system attached to the front wheel and displaying a preprogrammed pattern.

Generally, the system 10 displays two types of images. In a pattern mode, the system displays one of four pre-programmed patterns (FIG. 7A). If the system 10 is not in the pattern mode, a message is displayed (FIG. 7). For both types of images, a number of image frames are used to create the image. The microcontroller uses the fixed reference frame to determine when to display the appropriate image frame. The fixed reference frame is sensed as described by use of the optical switch 22 and reference markers 76. In the illustrated embodiment, the fixed reference frame includes 120 angular positions (sixty reference markers 76 and sixty spaces between markers), and the system 10 can display an image frame at each angular position. Thus, separate image frames can be produced at 120 angular positions. As an example, a visually perceptible image of the letter "A" is produced with five image frames, as shown in FIGS. 6A–6F. FIG. 6B shows image frame FR1, wherein all 7 LEDs 84 of the array are illuminated at the appropriate position during rotation to form the left leg of the letter "A". FIG. 6C shows image frame FR2, wherein two LEDs 84 are illuminated at the first and fourth positions of the array (counting from the radially outermost LED of the array) at a position just to the right of image frame FR1. FIGS. 6D and 6E show image frames FR3 and FR4, which are similar to image frame FR2 and positioned just to the right of image frames FR2 and FR3, respectively. Finally, FIG. 6F shows image frame FR5, wherein all 7 LEDs 84 are illuminated to the right of image frame FR4 to form the right leg of the "A". Because of the "after image" effect, the five image frames are perceptible to an observer. FIG. 6A shows the complete image of an "A" as it appears to an observer. Other images are formed in a similar manner. An entire message may be formed such as the example shown in FIG. 7, or one of the pre-programmed patterns may be formed as shown in FIG. 7A.

Preferably, each array 24A–24E is used to display an image frame each time the array passes through the predetermined angular position required to create the image. In other words, each array 24A–24E will have the same LEDs 84 illuminated as each array passes a given angular position. Thus, with each rotation of the front wheel 12, each image frame is displayed five times so a perceptible image will be displayed by the system 10 even at a relatively slow rotational speed. Adding more arrays generally will decrease the rotational speed required to generate a perceptible image, and using fewer arrays will have the opposite effect. It is to be understood that using more or less than five arrays is within the scope of this invention.

Figure 8A:
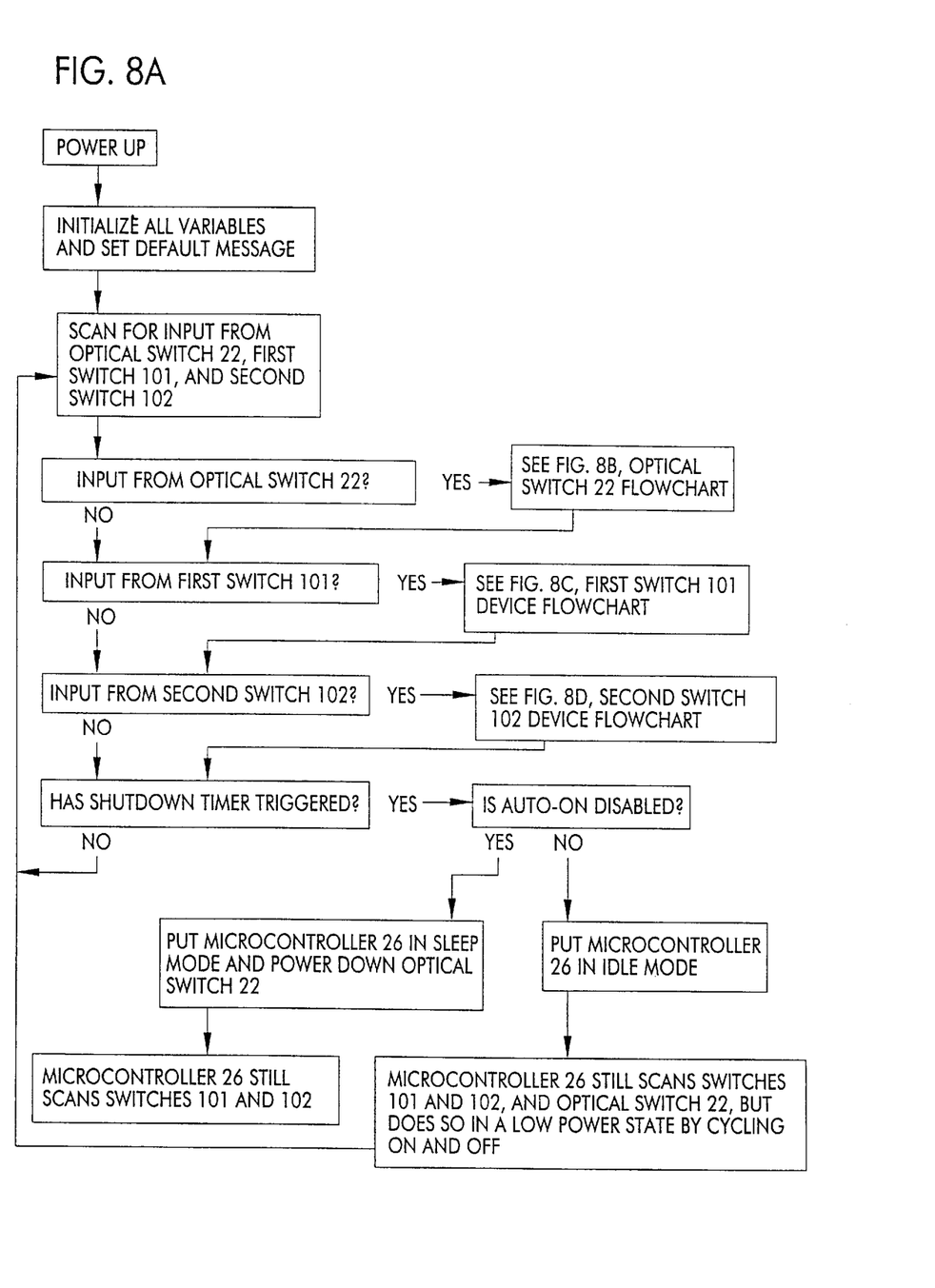
FIG. 8A shows system operation upon power-up of the system.
Figure 8B:
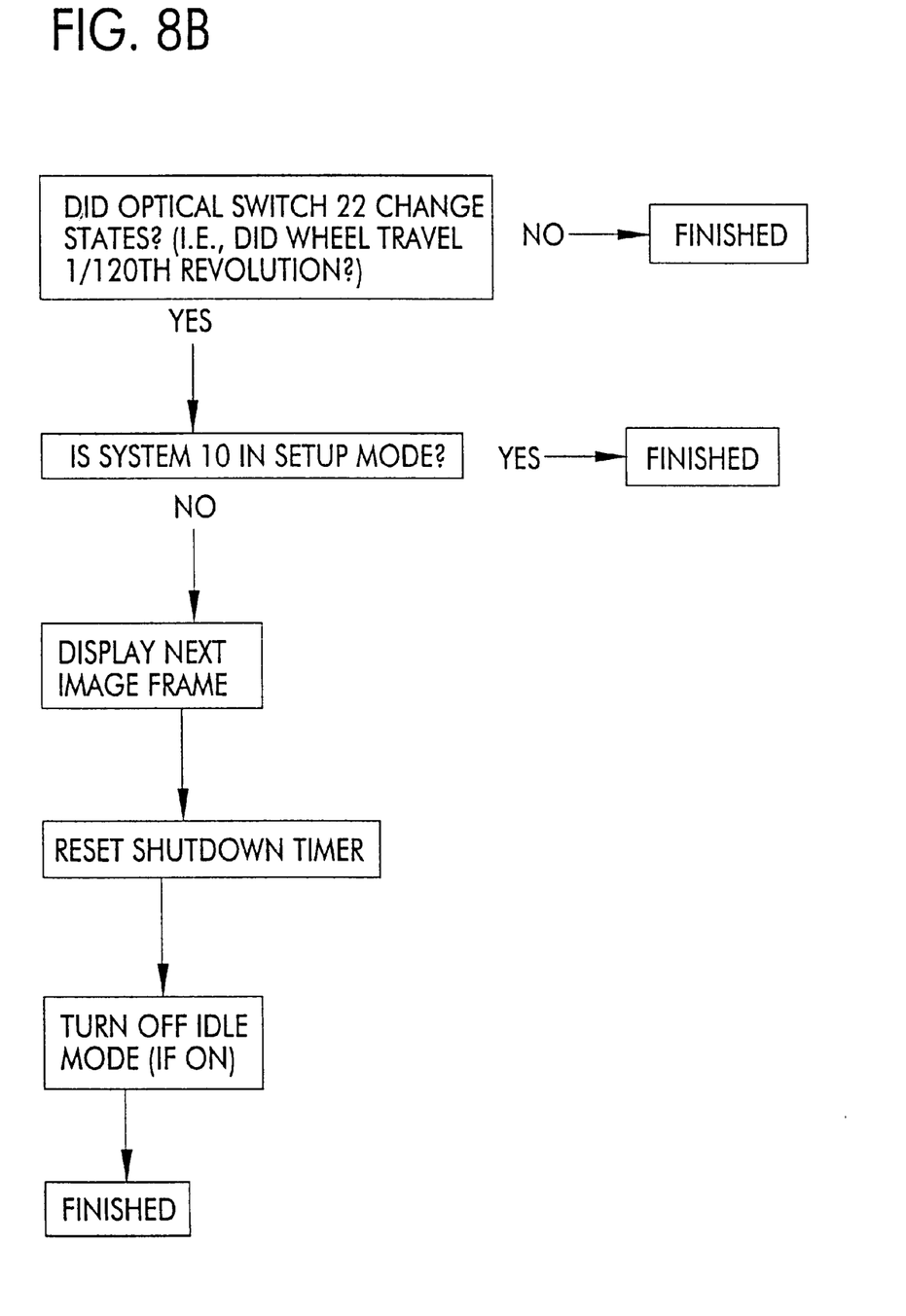
FIG. 8B shows system processing of input from an optical switch capable of detecting that the wheel has rotated a fraction of a revolution.
Figure 8C:
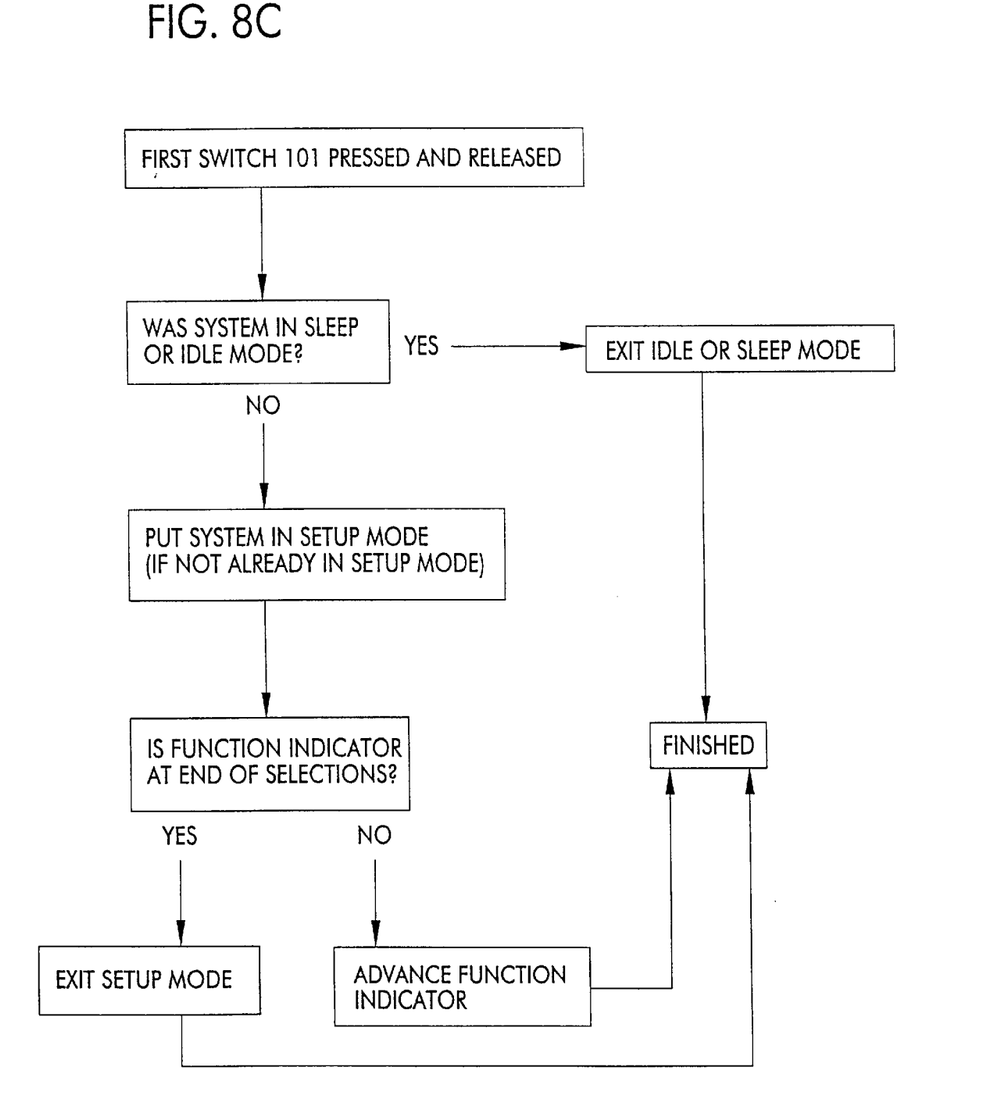
FIG. 8C shows system processing after a first push-button switch has been pressed.
Figure 8D:
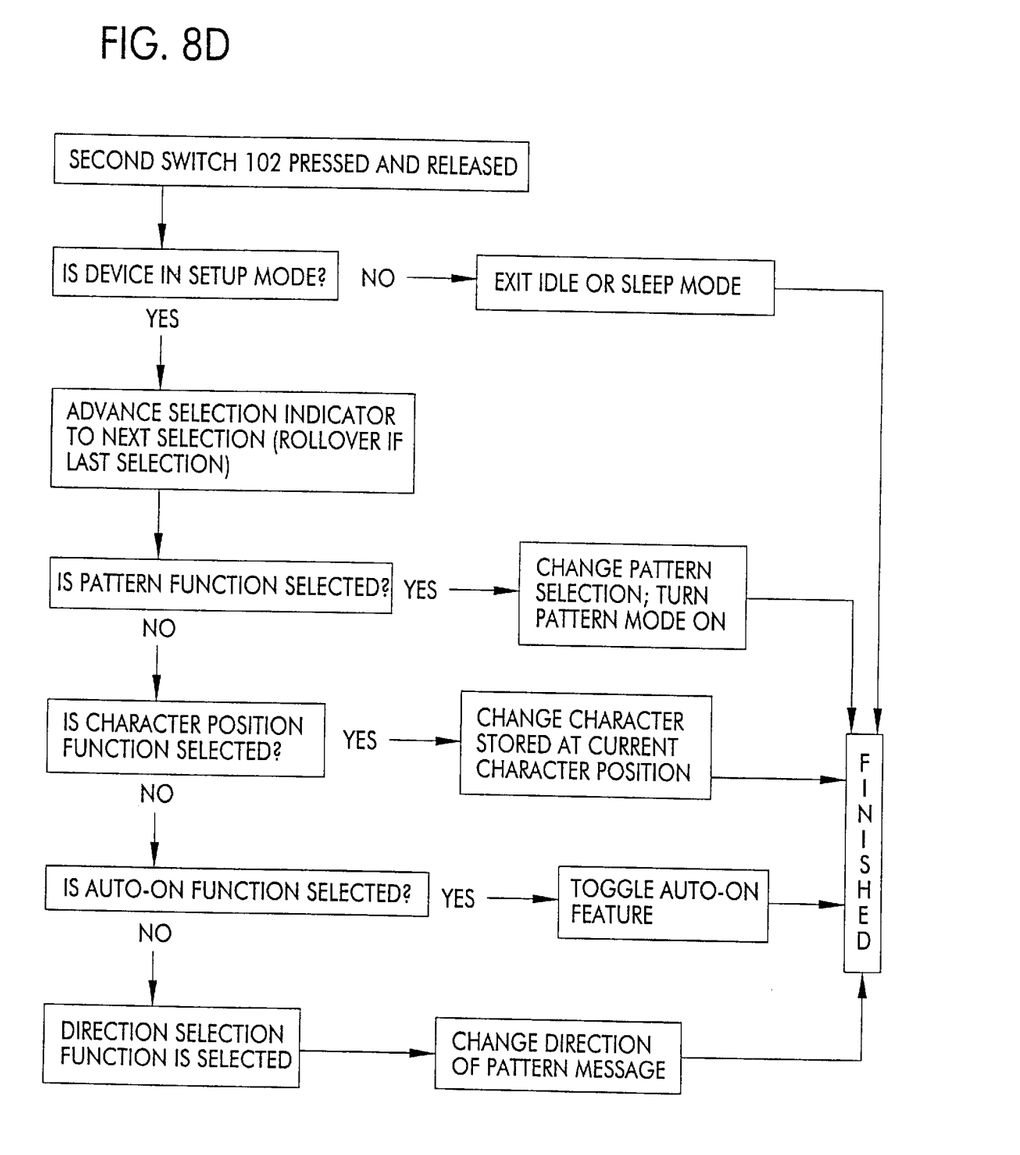
FIG. 8D shows system processing after a second push-button switch has been pressed.

The microcontroller is programmable so that the system 10 displays a programmable text message or one of several pre-programmed patterns. The method for programming described herein is one of several possible ways of programming the system 10 and other means of programming are within the scope of this invention. Referring to FIG. 8A, upon power being first provided to the system 10, the microcontroller initializes variables required to set a default message or pattern to be displayed. Then the microcontroller scans for input from the optical switch 22, first switch 101 and second switch 102. Input from the optical switch 22 is processed as described below and as shown in FIG. 8B. Input from first switch 101 and second switch 102 is processed as described below and as shown in FIGS. 8C and 8D.

A shutdown timer provided within the microcontroller is triggered if no input is received from any of the switches within a preset period of time, e.g. ten minutes, causing the microcontroller to go into a sleep mode or idle mode. If the auto-on feature is disabled, the system 10 conserves power by entering the sleep mode wherein the microcontroller still scans for input from first switch 101 and second switch 102, but power to the optical switch 22 is turned off. If the auto-on feature is not disabled, the system 10 conserves power by entering an idle mode wherein the microcontroller will interrupt power to itself and the optical switch 22 for a fraction of a second, e.g. 1/60th of a second, and then provide power to itself and the optical switch for a short period of time, e.g. 1/30th of a second, to again scan for input from the switches. The system 10 continues to cycle on and off in the idle mode until it receives input from any of the switches. Upon receiving input, the system 10 exits idle mode.

Referring to FIG. 8B, if the system 10 is in setup mode, meaning that it is being programmed, then the microcontroller takes no action in response to the signal from the optical switch 22. If the system 10 is not in setup mode, then the microcontroller sends appropriate signals to LEDs 84 to display the next image frame. After the image frame is displayed, the shutdown timer is reset and if it was in idle mode it exits idle mode. Thereafter, the system 10 is ready for input again as described above with respect to FIG. 8A.

In the setup mode, the system is programmable by the user to display the text message of up to 20 characters or one of 4 pre-programmed patterns, numbered P1–P4 (FIG. 1). An example of one of the pre-programmed patterns is shown in FIG. 7A. A function to be changed is indicated by a first LED (not shown), referred to as a function indicator, which is either illuminated or blinking adjacent to one of the symbols 96 (FIG. 1). There are four general functions as follows: (1) the "image" function, which refers to whether one of the pre-programmed patterns or the programmed text message will be displayed, and indicated by the symbol "Image" on the fourth array 24D (2) the character position function, indicated by "C1" through "C20" on the first through third arrays 24A–24C, (3) the auto-on function or mode, indicated by "Auto" on the fourth array, and (4) the direction function, in which the direction of rotation of the system 10 is input, indicated by "Dir" on the third array. A selection within one of these functions is indicated by a second illuminated or blinking LED (not shown) referred to as a selection indicator. The potential selections are: (1) whether the text message is selected or which one of the four pre-programmed patterns is selected, (2) which character is selected at the particular character position, (3) whether auto-on mode is on or off, and (4) which direction the system will rotate. Note that there are symbols positioned on the base cover 28 on both sides of each LED (FIG. 1). Therefore, to indicate whether the symbol on the right side or the left side of the LED is indicated during programming, the function indicator or selection indicator LED will blink if the symbol to the right of the LED is indicated, and it will be constantly lit if the symbol to the left of the LED is indicated.

Referring to FIG. 8C, if first push-button switch 101 is pressed, and if the system 10 is currently in idle or sleep mode, the microcontroller 26 exits the mode, thus "awakening" the system 10 for use. If the system 10 is not in the sleep or idle mode when the switch is pressed, and it is not already in the setup mode, then the system enters the setup mode. When the system 10 first enters setup mode, the first function indicated is the "Image" function. Thereafter, successive depressions of first switch 101 will cause the character positions "C1"–"C20" to be indicated, then the "Auto" function and finally, the "Dir" function. If the function indicator is not at the end of the possible functions, then the function indicator is advanced to the next function. However, if the function indicator is at the end of the possible functions, meaning it is at the direction selection function when first switch 101 is pressed, then the system 10 exits setup mode.

Referring to FIG. 8D, when second push-button switch 102 is pressed, the response depends on whether the system 10 has been placed in setup mode by first switch 101 having been pressed. If the system 10 is not in setup mode, then the system will reset the shutdown timer and, if the system is in sleep mode or idle mode, it will turn on power to the optical switch 22 and activate the microcontroller 26. If the system 10 is in setup mode, then the selection indicator will be advanced to the next selection. The next selection varies by what function the system is changing, as explained above. If the "Image" function is indicated, the next selection will either be one of the four patterns or the "Text" selection for a text message. If one of the character positions is indicated, the next selection will be a letter A–Z, a number 0–9, or one of the symbols "sp" (for space), "?" or "!". If the auto-on function is indicated, the next selection will be on or off. If the direction function is indicated, the next selection will be one of the symbols indicating direction. The second switch 102 can be repeatedly pressed until the selection light indicates (1) the desired pattern, when the pattern function is indicated, (2) the desired letter, number or symbol, when a character position is indicated, (3) the desired status of the auto-on feature, either on or off, when the "Auto" function is indicated, or (4) the direction of display, either clockwise or counter-clockwise depending on which side of the bicycle 14 the system is mounted, when the "Dir" function is indicated. Note that the system 10 will "rollover" to the first possible selection if second switch 102 is pressed when the last selection is indicated.

As an example, and referring to FIGS. 1 and 7, the phrase "SHOW ME THE MONEY" will be programmed. The first selection to be made is whether to display the text message or one of the pre-programmed patterns. Upon pressing first switch 101, the LED adjacent to the symbol "Image" will blink (the LED blinks to indicate the symbol to the right of the LED is indicated, and not the "W") indicating that the user can select between the text message and the four patterns. Also, the LED adjacent to the symbol "Text" will blink indicating that the user has currently selected to display the text message. Thereafter, the user could change the current selection to one of the four pre-programmed patterns by pressing second switch 102. In this example, second switch 102 is not pressed so that "Text" is selected and the text message, rather than one of the patterns will be displayed. The user again presses first switch 101, and the system 10 is thus programmed to display the text message. Next, the user programs the characters of the text message. The function indicator indicates to the user which character position is currently being programmed. The function indicator, i.e., the LED adjacent to the "C1" will blink, indicating that character position "C1" is currently changeable. The selection indicator, i.e., the LED adjacent to, for instance "B", will be illuminated to indicate the character currently selected at the character position "C1". Note that whenever the same LED needs to be both illuminated and blinking the LED will simply blink. For example, if the "C1" character position is indicated and the character "A" is selected, and since both are adjacent the same LED, the system 10 will cause that LED to blink. Since no other LED would be on at the time, the user is thereby informed that "A" is currently chosen for the "C1" character position. The user then cycles through the characters A–R, until the LED adjacent character "S" is illuminated. The desired character "S" for character position "C1" is selected, the user presses first switch 101 and character position "C1" is thus programmed with an "S". The function indicator next indicates that the character position "C2" is to be programmed. The LED adjacent to "C2" thus blinks. The user can again cycle through the characters using second switch 102 until "H" is selected. First switch 101 is then pressed to program "H" for character position "C2". The process is repeated for character positions "C3" through "C20", by choosing the characters as shown in FIG. 7. Note that spaces between words and after the "Y" in "MONEY" are programmed by selecting "sp". When character position "C20" is indicated, the user selects "sp", and thereafter the next press of first switch 101 will cause the "Auto" function to be indicated and the LED adjacent to "Auto" to blink. A second LED will blink to indicate whether the function is on or off. In the first instance, the "Auto" function is turned on so the LED adjacent "ON" will blink. The user can select to turn the Auto-on function on or off by pressing second switch 102. The next press of first switch 101 will cause Auto-on to be programmed, and cause the "Dir", or direction, function to be indicated. The LED adjacent to "Dir" will then blink, and a second LED will blink to indicate whether the system will rotate clockwise or counter-clockwise. In the first instance, the LED adjacent the arrow symbol indicating clockwise will blink (top of fifth array 24E). The user can then input whether the system will be rotating clockwise or counter-clockwise by pressing second switch 102. If the system is mounted on the right side of the front wheel 12 as shown in FIG. 1, the user will input clockwise (the default) because that is the direction of rotation of the system when the bicycle 14 is moving forward. Effectively then, the direction function allows the user to mount the system 10 on either side of the wheel. The system could also be programmed without the direction function, but that would require that the system always be mounted on, for instance, the right side of the wheel. Finally, the next press of first switch 101 will cause the direction function to be programmed and will cause the system 10 to exit setup mode. Thereafter, when the front wheel 12 is moving as shown in FIG. 7, the system 10 will display the necessary image frames to display the message just programmed.

Note that the means for programming the system 10 just described could be varied and still be within the scope of this invention. For instance, the system 10 might be provided with an interface so that the system could be programmed by an external computer, such as a personal computer.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A light display system adapted for mounting on a vehicle wheel rotatable about an axis of rotation and capable of generating an image visually perceptible in a reference frame fixed relative to the vehicle wheel, the display system comprising:

a base having a center;

a connector for mounting the base on the vehicle wheel for conjoint rotation with the vehicle wheel about the axis of rotation;

plural light arrays mounted on the base at angularly spaced locations around the center of the base, each light array comprising a plurality of lamps;

a sensor operable to detect the fixed reference frame and to provide a signal indicative of the position of the base relative to the fixed reference frame;

a reference member mounted on the base for providing the indication of the fixed reference frame;

a controller operatively connected to the sensor for receiving the signal from the sensor and operatively connected to the light arrays, the controller being configured for firing the light arrays in predetermined positions relative to the fixed reference frame to form the image upon rotation of the light arrays which is visually perceptible in the fixed reference frame; and means mounted on the base for programming the controller to display alphanumeric messages and patterns.

2. A light display system as set forth in claim 1 wherein the controller is configured to fire predetermined numbers of the lamps in each light array according to the position of the light array relative to the reference frame.

3. A light display system as set forth in claim 2 wherein the controller is configured to fire the same number of lamps in each light array when that light array reaches the same angular position relative to the fixed reference frame.

4. A light display system as set forth in claim 1 wherein the reference member includes means for fixing the reference member relative to the fixed reference frame and disposed for detection by the sensor thereby providing the indication of the fixed reference frame.

5. A light display system as set forth in claim 4 wherein the reference member includes a finger engageable with a structure in the fixed reference frame to fix the reference member relative to the fixed reference frame.

6. A light display system as set forth in claim 5 wherein the reference member comprises a plurality of reference markers located at equiangularly spaced locations and positioned for detection by the sensor.

7. A light display system as set forth in claim 6 wherein the reference member and base are generally annular in shape, the reference member being slidingly mounted on an internal diameter of the base.

8. A light display system as set forth in claim 6 wherein the sensor comprises a generator and a detector, the generator being mounted on the base for rotation with the vehicle wheel and capable of generating a light beam, the detector positioned on the opposite side of the reference markers from the generator for creating a signal when the light beam is interrupted by the markers, thereby indicating that the vehicle wheel has rotated a predetermined fraction of a revolution.

9. A light display system as set forth in claim 4 wherein the reference member comprises a plurality of reference markers located at equiangularly spaced locations and positioned for detection by the sensor.

10. A light display system as set forth in claim 1 wherein each light array is positioned at substantially equal radial distance from the center of the base, the lamps of each light array being arranged in a single, radially extending row.

11. A light display system as set forth in claim 10 wherein the light arrays are spaced apart at substantially equal angular intervals about the axis of rotation.

12. A light display system as set forth in claim 11 wherein the system includes at least 3 light arrays and wherein each light array includes at least 5 lamps.

13. A position reference system adapted for mounting on a vehicle wheel rotatable about an axis of rotation, the position reference system comprising:

a base adapted for mounting on the vehicle wheel for rotation with the vehicle wheel about the axis of rotation;

a sensor operable to detect a fixed reference frame and to provide a signal indicative of the fixed reference frame;

a controller operatively connected to the sensor for receiving the signal from the sensor; and a reference member mounted on the base for movement relative to the base, said reference member including means for fixing the reference member relative to the fixed reference frame and disposed for detection by the sensor thereby providing the indication of the fixed reference frame.

14. A light display system as set forth in claim 13 wherein the reference member comprises a finger engageable with a structure in the fixed reference frame to fix the reference member relative to the fixed reference frame.

15. A light display system as set forth in claim 13 wherein the reference member comprises a plurality of reference markers located at equiangularly spaced locations and positioned for detection by the sensor.

16. A light display system as set forth in claim 15 wherein the reference member and base are generally annular in shape, the reference member being slidingly mounted on an internal diameter of the base.

17. A light display system as set forth in claim 16 wherein the sensor comprises a generator and a detector, the generator being mounted on the base for rotation with the vehicle wheel and capable of generating a light beam, the detector positioned on the opposite side of the reference markers from the generator for creating a signal when the light beam is interrupted by the markers, thereby indicating that the vehicle wheel has rotated a predetermined fraction of a revolution.

18. A light display system mounted on a vehicle wheel rotatable about an axis of rotation and capable of generating a two-dimensional image visually perceptible in a reference frame fixed relative to the vehicle wheel, the display system comprising:

an annular base mounted on one side of the vehicle wheel for rotation with the vehicle wheel about the axis of rotation, the base having a center, the base extending axially from the vehicle wheel a distance significantly less than the diameter of the base;

plural light arrays mounted on the base at angularly spaced locations around the center of the base, each light array comprising a plurality of lamps, the light arrays being coplanar and lying in a plane that is perpendicular to the axis of rotation for forming the two-dimensional image;

a sensor mounted on the base and operable to provide a signal indicative of the position of the base relative to the fixed reference frame;

a controller mounted on the base and operatively connected to the sensor for receiving the signal from the sensor and operatively connected to the light arrays, the controller being configured for firing the light arrays in predetermined positions relative to the fixed reference frame to form the image upon rotation of the light arrays which is visually perceptible in the fixed reference frame; and means mounted on the base for programming the controller to display alphanumeric messages and patterns.

19. A light display system as set forth in claim 18 wherein the light arrays are spaced apart at substantially equal angular intervals about the axis of rotation, wherein the system includes at least 3 light arrays and each light array includes at least 5 lamps.

* * * * *